(12) United States Patent
Liu et al.

(10) Patent No.: US 7,641,935 B2
(45) Date of Patent: Jan. 5, 2010

(54) METHOD OF LIQUID CRYSTAL ALIGNMENT FOR A FLEXIBLE LCD WITH MICRO-GROOVES

(75) Inventors: Kang-Hung Liu, Chu Pei (TW); Chi-Chang Liao, Tai Nan (TW); Ching-Hsiang Chan, Hsin Chu (TW); Yu-Chu Hung, Miao Li Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 937 days.

(21) Appl. No.: 11/143,487

(22) Filed: Jun. 3, 2005

(65) Prior Publication Data

US 2005/0271803 A1    Dec. 8, 2005

(30) Foreign Application Priority Data

Jun. 4, 2004    (TW)    ............................... 93116220 A (51) Int. Cl.
*B05D 5/06*    (2006.01)
(52) U.S. Cl. ......................................... 427/162; 427/58
(58) Field of Classification Search ...................... None
See application file for complete search history.

(56) References Cited

U.S. PATENT DOCUMENTS 5,705,096 A * 1/1998 Kano et al. ............... 252/299.4
2003/0152849 A1 * 8/2003 Chan-Park et al. ............ 430/22
2004/0131861 A1 * 7/2004 Chae et al. ................. 428/411.1
2004/0150141 A1 * 8/2004 Chao et al. ................... 264/494
2005/0007651 A1 * 1/2005 Liang et al. .................. 359/296

FOREIGN PATENT DOCUMENTS

WO    WO/03/062872    *    7/2003

* cited by examiner

*Primary Examiner*—Mark F Huff
*Assistant Examiner*—Anna L Verderame
(74) *Attorney, Agent, or Firm*—Rabin & Berdo, P.C.

(57) ABSTRACT

The present invention is method of liquid crystal alignment for a flexible LCD with micro-grooves comprising: coating a thermoplastic material onto a conductive film; heat embossing a plurality of micro-grooves formed by a mold, wherein the surface of said mold forms said plurality of micro-grooves; and aligning said plurality of micro-grooves with an aligning wall and grooves. The present invention also adds a plurality of liquid alignment technology in roll-to-toll micro cell LCD processes. The plurality of liquid alignment technology lets the micro cells of the LCD from without aligning with an alignment LCD mode (such as TN, VA or horizontal alignment) and achieves a better contrast and display quality.

9 Claims, 12 Drawing Sheets

METHOD OF LIQUID CRYSTAL ALIGNMENT FOR A FLEXIBLE LCD WITH MICRO-GROOVES

BACKGROUND OF THE INVENTION

1. Field of the Invention

The present invention relates to a method of liquid crystal alignment for a flexible LCD with micro-grooves added to a plurality of liquid alignment technology in a roll-to-roll micro cell LCD process to make a flexible LCD with micro-grooves.

2. Description of Related Art

LCD monitors are rapidly replacing CRT monitors and becoming indispensable peripheral products in computer and electronic products.

LCD monitor process technology is continual improving, such as the change from hard silicon or glass substrate to flexible or thin metallic substrate, capable of making assorted flexible display with bent curves and big area micro-electronic products. The roll-to-roll print process is used when making large flexible display products such as electronic paper or electronic books.

In the prior technology, Sipix Corporation used embossing technology and a process method of roll-to-roll to make micro-cup architecture, injecting polymer dispersed liquid crystals without alignment. Finally, with a contrast of about 10-20, the flexible LCD is finished after the sealing process. The micro-cup architecture of the flexible LCD could not align; it could only be used in scattering mode because of the lack of contrast.

SUMMARY OF THE INVENTION

The present invention provides a method of liquid crystal alignment for a flexible LCD with micro-grooves comprising: coating of a thermoplastic material on a conductive film; thermal embossing a plurality of micro-grooves and wall from a mold, wherein the surface of said mold forms said plurality of micro-grooves and wall; and forms an aligning micro cell structure.

The present invention also provides a plurality of liquid alignment technology in the roll-to-roll micro cell LCD processes. The plurality of liquid alignment technology lets the micro cells of the LCD formed without aligning in LCD mode (such as TN, VA or horizontal alignment) and achieves a better contrast and display quality.

BRIEF DESCRIPTION OF THE DRAWINGS

The various objectives and advantages of the present invention will be more readily understood from the following detailed description when read in conjunction with the appended drawings, in which.

DETAILED DESCRIPTION OF PREFERRED EMBODIMENTS

Currently, most manufacturers use the micro-cup with polarization rays alignment technology of the LCD mode (as VA, TN or Homogeneous) to produce flexible LCDs.

Figure 1:
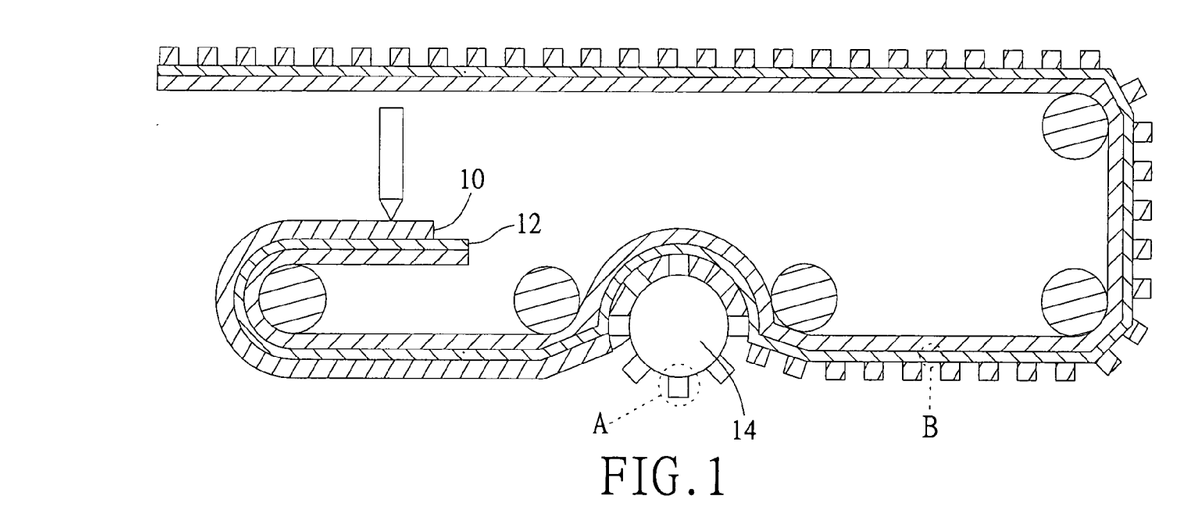
FIG. 1 is a process flow of embossed micro-grooves and spacing wall of the present invention.
Figure 1A:
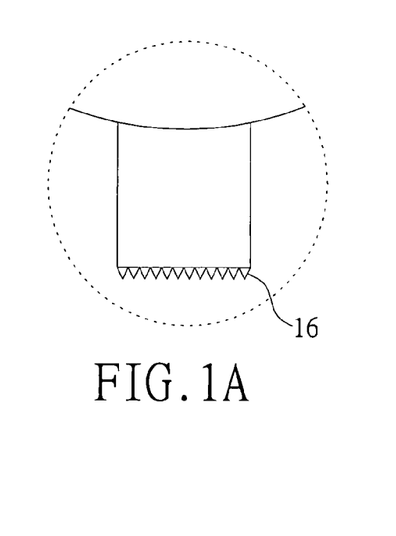
FIG. 1A is a detail of part A of FIG. 1.
Figure 1B:
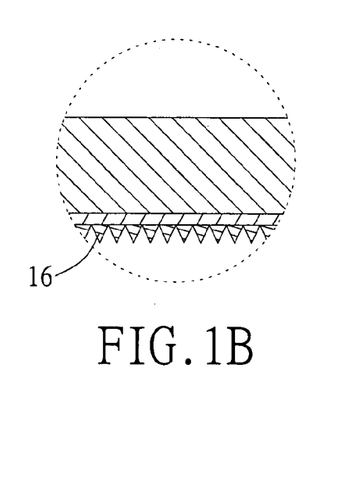
FIG. 1B is a detail of part B of FIG. 1.
Figure 1C:
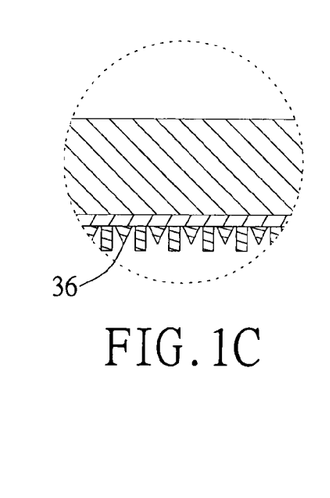
FIG. 1C is another detail of part B of FIG. 1.

FIG. 1 shows a process flow for embossed micro-grooves and spacing wall of the present invention comprising a thermoplastic material 10, a conductive film 12 and a mold 14. FIG. 1A shows a detail of part A of the FIG. 1. The surface of the mold includes a plurality of micro-grooves 16. The thermoplastic material 10 is embossed and heated to form said plurality of micro-grooves and wall of the mold 14 simultaneously. FIG. 1B shows a detail of part B of the FIG. 1. FIG. 1B is said plurality of micro-grooves after being embossed. FIG. 1C shows a detail of another part B of the FIG. 1. FIG. 1C shows another plurality of micro-grooves 36 after being embossed. Another plurality of micro-grooves is a plurality of protrusions.

Figure 2:
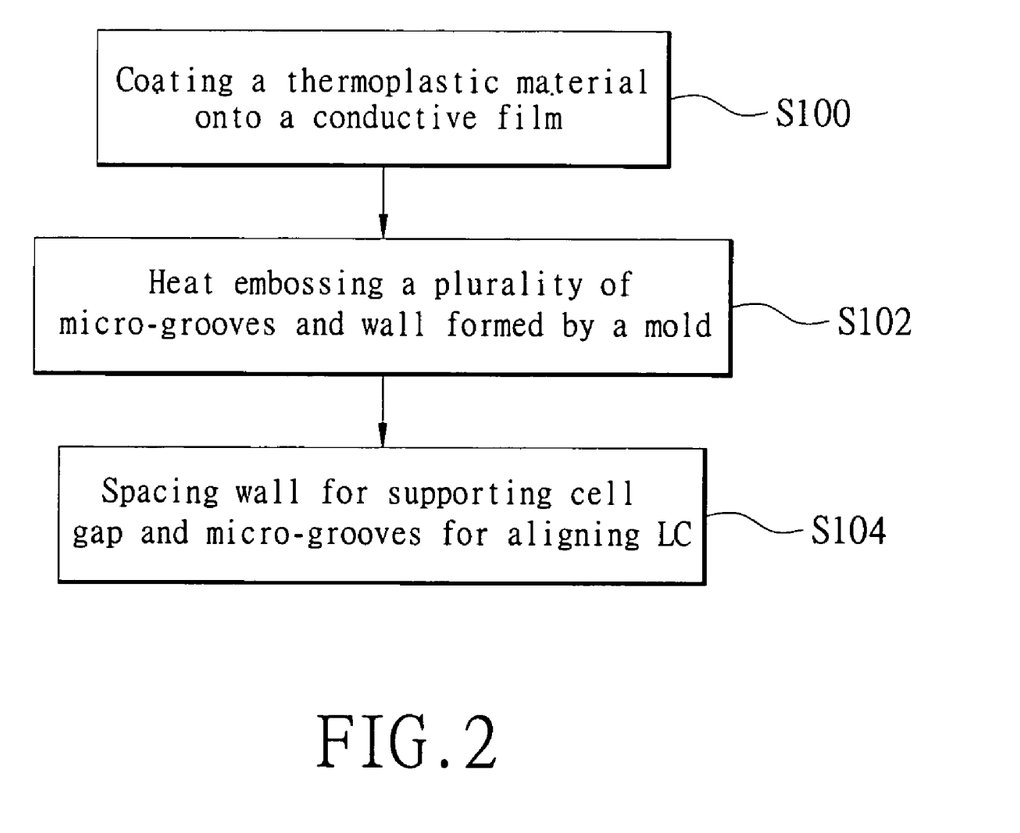
FIG. 2 is a flowchart of the method aligning the embossed micro-grooves and spacing wall of the present invention.

FIG. 2 shows a flowchart of a method of aligning the embossed micro-grooves and wall of the present invention, comprising: coating a thermoplastic material on a conductive film (S100); heat embossing a plurality of micro-grooves and wall formed by a mold (S102); wherein the surface of said mold with said plurality of micro-grooves is formed and located inside a plurality of display locations and forming said plurality of spacing wall for supporting cell gap and micro-groove for aligning LC (S104).

Figure 3:
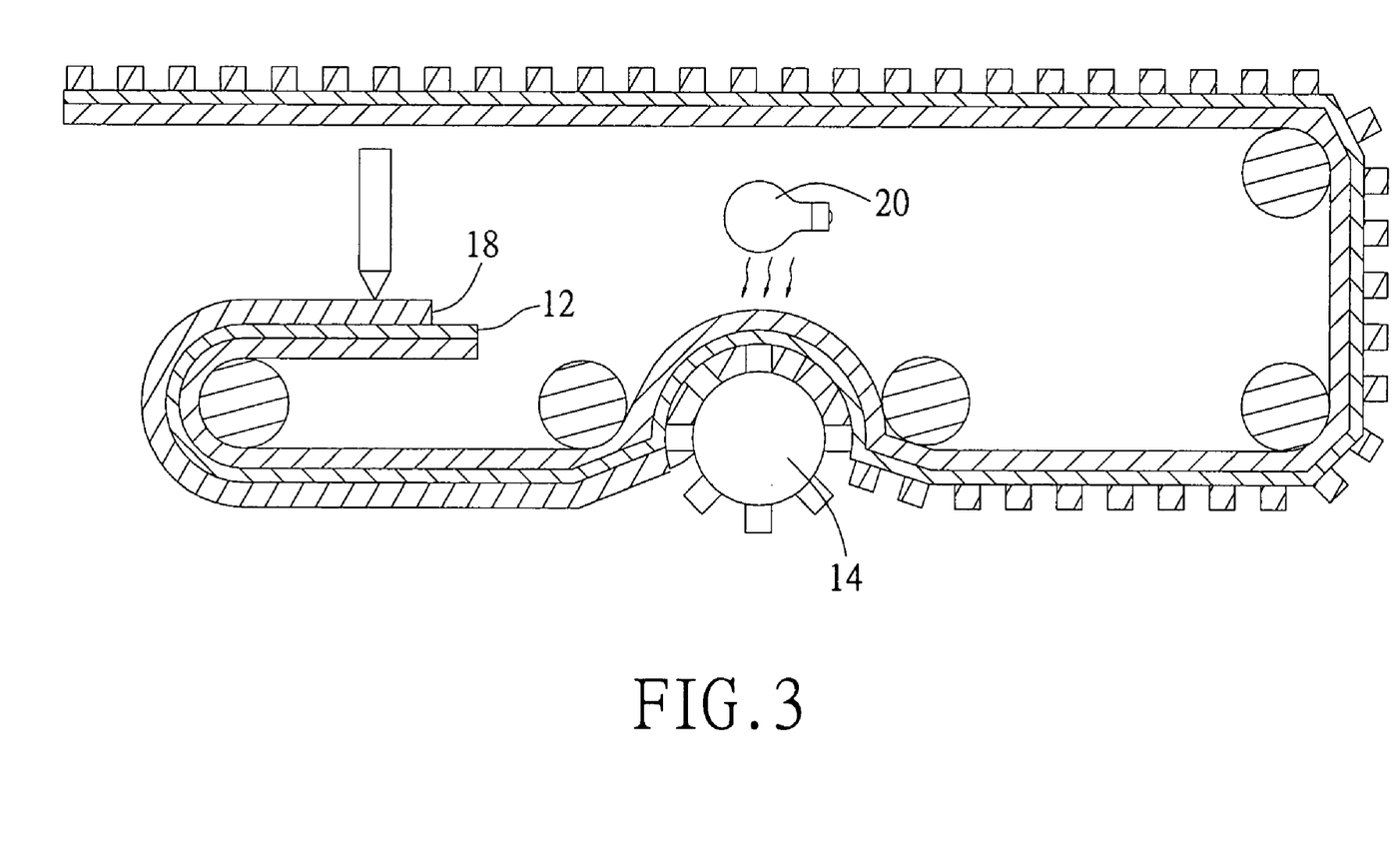
FIG. 3 is a process flow of UV embossed micro-grooves and wall of the present invention.

FIG. 3 shows a process flow of embossing micro-grooves and wall with ultraviolet light according to the present invention, comprising an ultraviolet seal material 18, a conductive film 12, a mold 14 and ultraviolet light 20. Wherein the surface of the mold is a plurality of micro-grooves 16. The ultraviolet seal material is embossed and the ultraviolet light and the mold 14 simultaneously forms said plurality of spacing wall for supporting cell gap and micro-groove for aligning LC.

Figure 4:
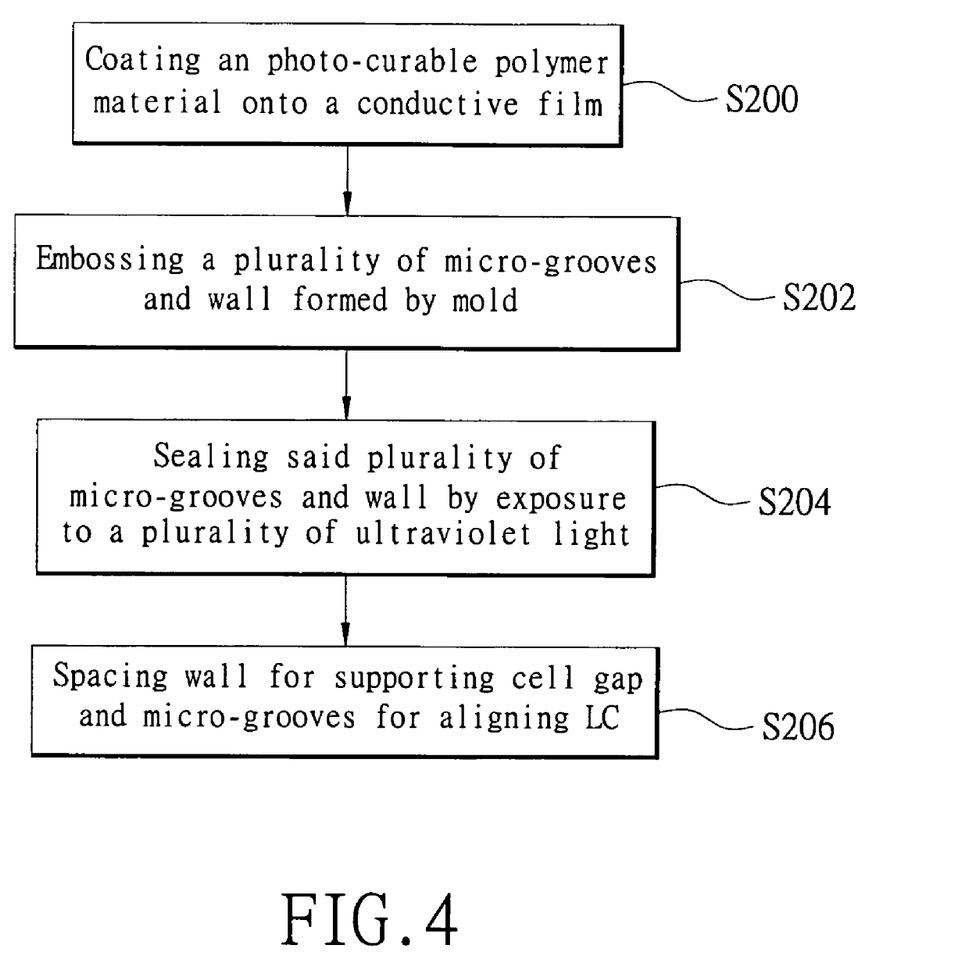
FIG. 4 is a flowchart of the method of UV embossed micro-grooves and wall of the present invention.

FIG. 4 shows a flowchart of a method aligning the embossed micro-grooves and wall with ultraviolet light according to the present invention, comprising: coating an photo-curable polymer material on a conductive film (S200); embossing a plurality of micro-grooves and wall formed by mold (S202), wherein the surface of said mold and said plurality of micro-grooves is formed and located inside a plurality of display locations; sealing said plurality of micro-grooves and wall exposures by a plurality of ultraviolet light (S204); forming said plurality of spacing wall for supporting cell gap and micro-groove for aligning LC (S206).

Figure 5:
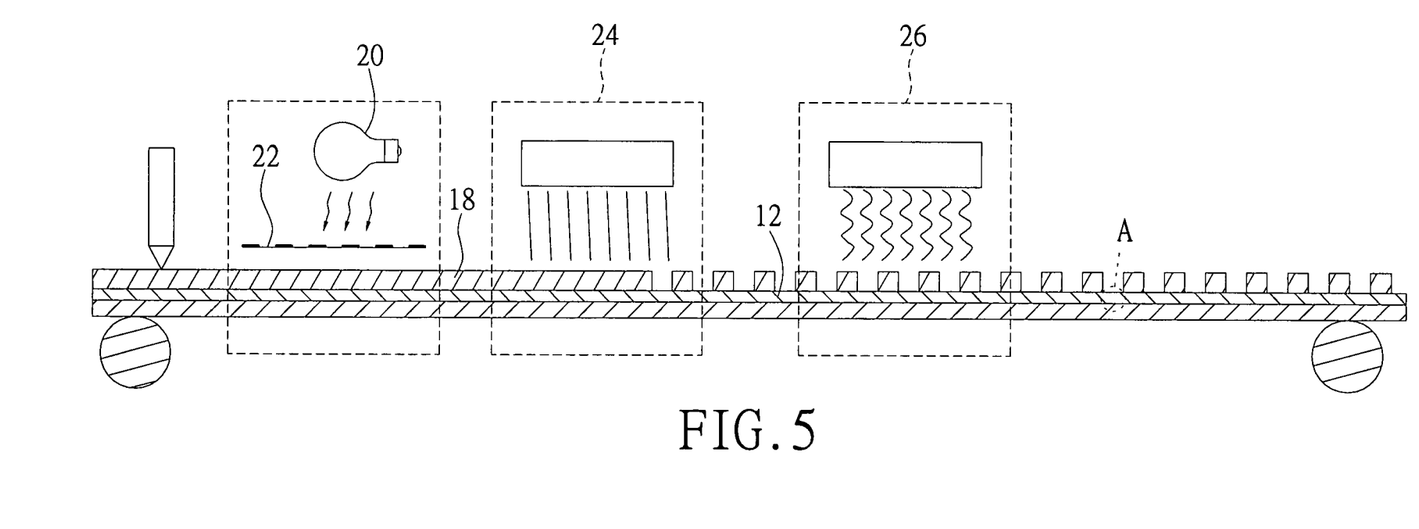
FIG. 5 is a process flow of making micro-grooves and wall with a gray scale mask of the present invention.
Figures 5A, 5B:
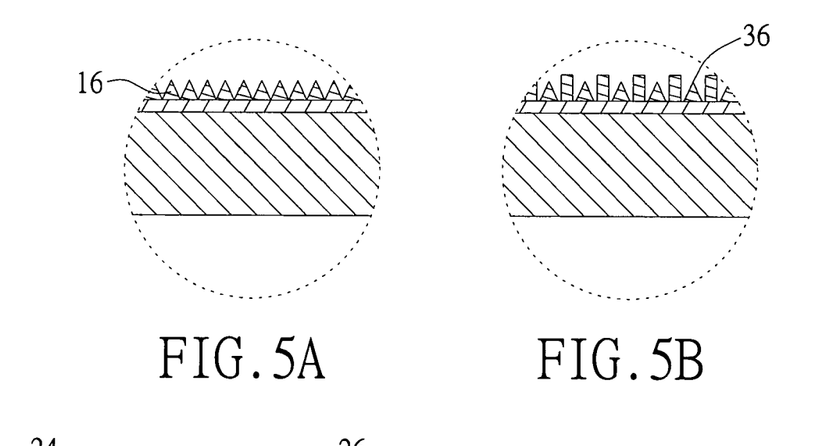
FIG. 5A is a detail of part A of FIG. 5.
FIG. 5B is another detail of part A of FIG. 5.

FIG. 5 shows a process flow of making micro-grooves and wall with a gray scale mask of the present invention, comprising a photo resistant layer, a conductive film 12, a light source 20 and a gray scale mask 22. The photo resistant layer through said light source 20 and said gray scale mask 22 makes said plurality of micro-grooves 16. FIG. 5A shows a detail of part A of the FIG. 5. FIG. 5B shows another detail of part A of the FIG. 5. FIG. 5B shows another plurality of micro-grooves 36 after being embossed. In this embodiment they are a plurality of protrusions. The photo resistant layer develops said plurality of micro-grooves by a development process 24. Finally, after being developed, said plurality of micro-grooves is sealed by a baking process 26.

Figure 6:
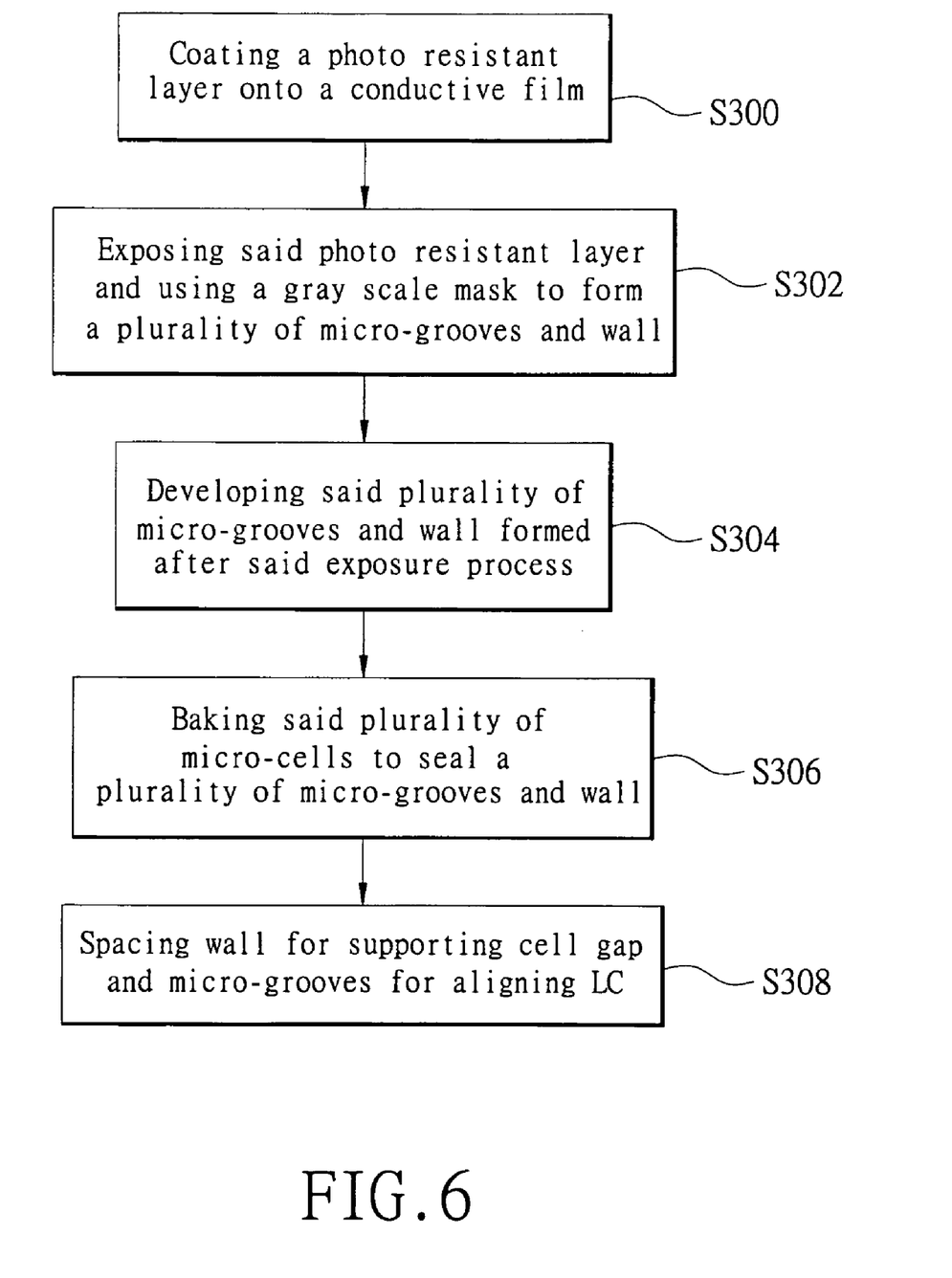
FIG. 6 is a flowchart of the method of aligning used when making micro-grooves and wall with a gray scale mask of the present invention.

FIG. 6 shows a flowchart of a method of making the micro-grooves and wall with a gray scale mask according to the present invention, comprising: coating a photo resistant layer on a conductive film (S300); exposing said photo resistant layer and using a gray mask to form a plurality of micro-grooves and wall (S302); developing said plurality of micro-grooves and wall formed after said exposure processed (S304), wherein said exposure rays are photolithographic; baking said plurality of micro-grooves to seal a plurality of micro-grooves and wall (S306), wherein said plurality of micro-grooves is located inside a plurality of display locations; forming said plurality of spacing wall for supporting cell gap and micro-groove for aligning LC (S308).

Figures 7, 7A, 7B:
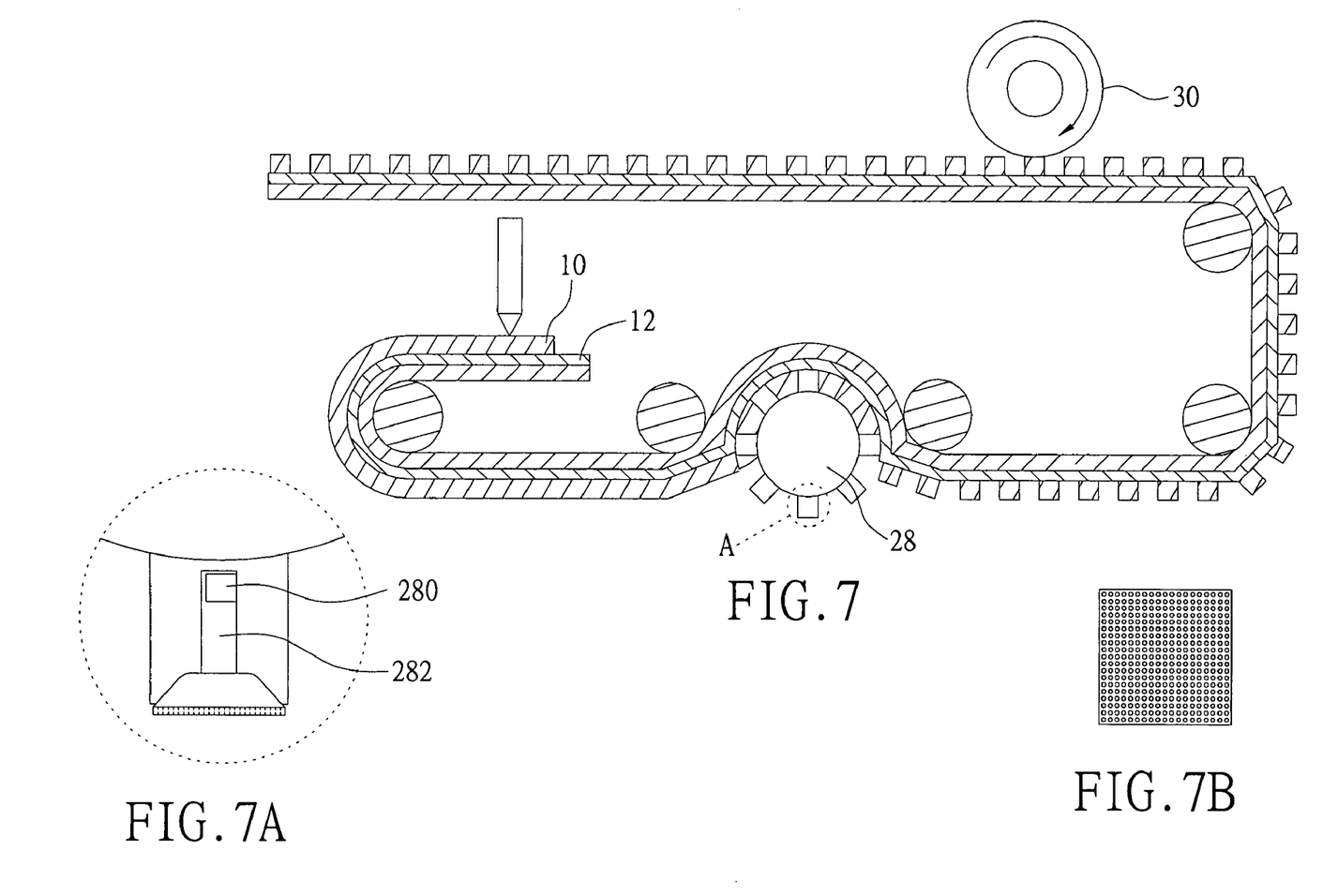
FIG. 7 is a process flow of printing alignment material and molding wall structures with a roller of the present invention.
FIG. 7A is a detail of part A of the FIG. 7.
FIG. 7B is a top-view chart of the bottom of the FIG. 7A.

FIG. 7 shows a process flow of making micro-grooves with a rubber roller of the present invention, comprising a thermoplastic material 10, a conductive film 12, gravure 28 and a roller aligner 30. Wherein the surface of the roller structure of the gravure 28 is a hollowed out pit and sets an alignment solvent injection apparatus 280 inside said pit. FIG. 7A shows a detail of part A of the FIG. 7. The pits of the roller structure are injected with an alignment material 282. The thermoplastic material 10 thermal embosses micro-cell walls and applies pressure to said gravure 28 simultaneously. The pit of the roller structure injects said alignment material inside said micro-cell. Wherein the surface of the pit of the roller structure includes a porous film. FIG. 7B shows a top-view chart of the bottom of the FIG. 7A. The plurality of micro-cells with the aligned alignment material is formed by the process of roller rubbing alignment.

Figure 8:
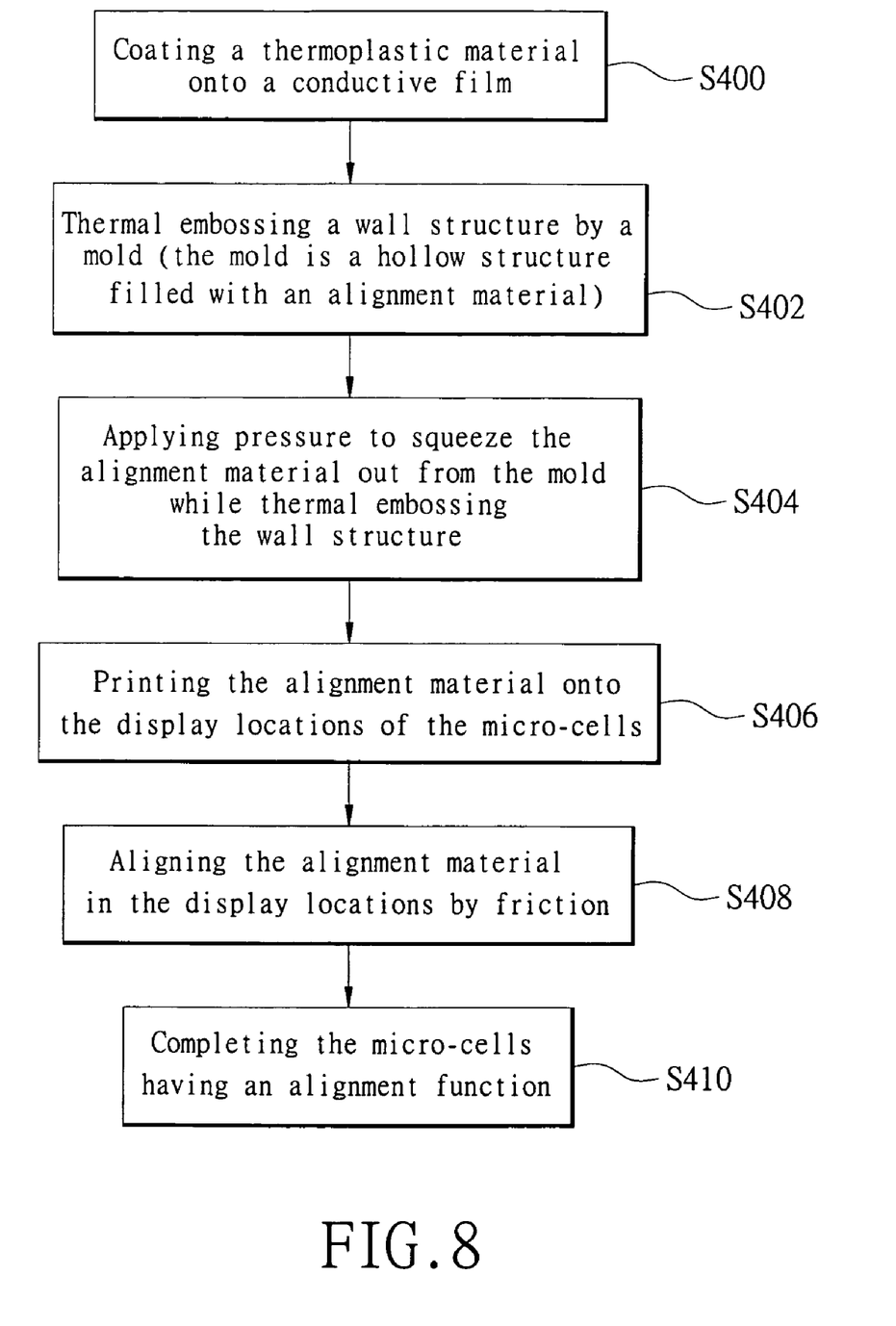
FIG. 8 is a flowchart of printing alignment material and molding wall structures of the present invention.

FIG. 8 shows a flowchart of a method of alignment when making micro-grooves with the rubber roller of the present invention, comprising: coating a thermoplastic material on a conductive film (S400); thermal embossing a wall structure by a mold (the mold is a hollow structure filled with an alignment material (S402); applying pressure to squeeze the alignment material out from the mold while thermal embossing the wall structure (S404), wherein said surfaces of the pits of the roller structure include a porous film; printing the photo-alignment solvent onto the display locations of the micro-grooves (S406); aligning the alignment material in the display locations by friction (S408); and completing the micro-grooves having an alignment function (S410).

Figure 9:
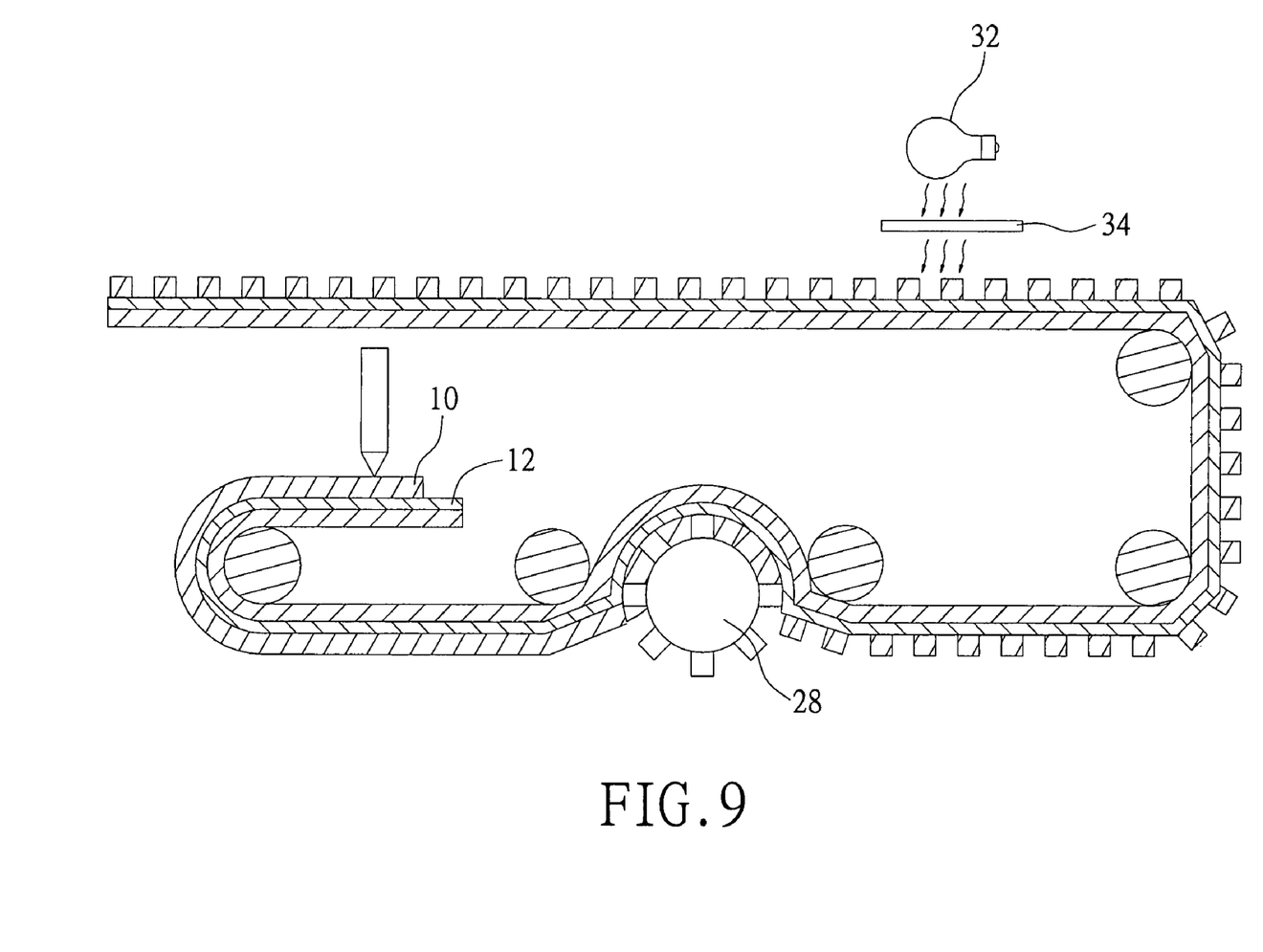
FIG. 9 is a process flow of printing photo alignment material and molding wall structures with the roller of the present invention.

FIG. 9 shows a process flow of making micro-grooves with the rubber roller of the present invention, comprising thermoplastic material 10, conductive film 12, a gravure 28, ultraviolet light 32 and a polarization mask 34. The surface of the roller structure of the gravure 28 is a hollowed out pit and an alignment material injection apparatus 280 injects a plurality of photo-alignment material 282 inside the space of said pit. The thermoplastic material 10 thermal embosses the micro-cell walls and applies pressure to said gravure 28 simultaneous. The pit of the roller structure injects said photo-alignment material inside said micro-cells. The polarized ultraviolet light exposure said plurality of photo-alignment material inside said micro-cells and forms said plurality of aligned micro-cells.

Figure 10:
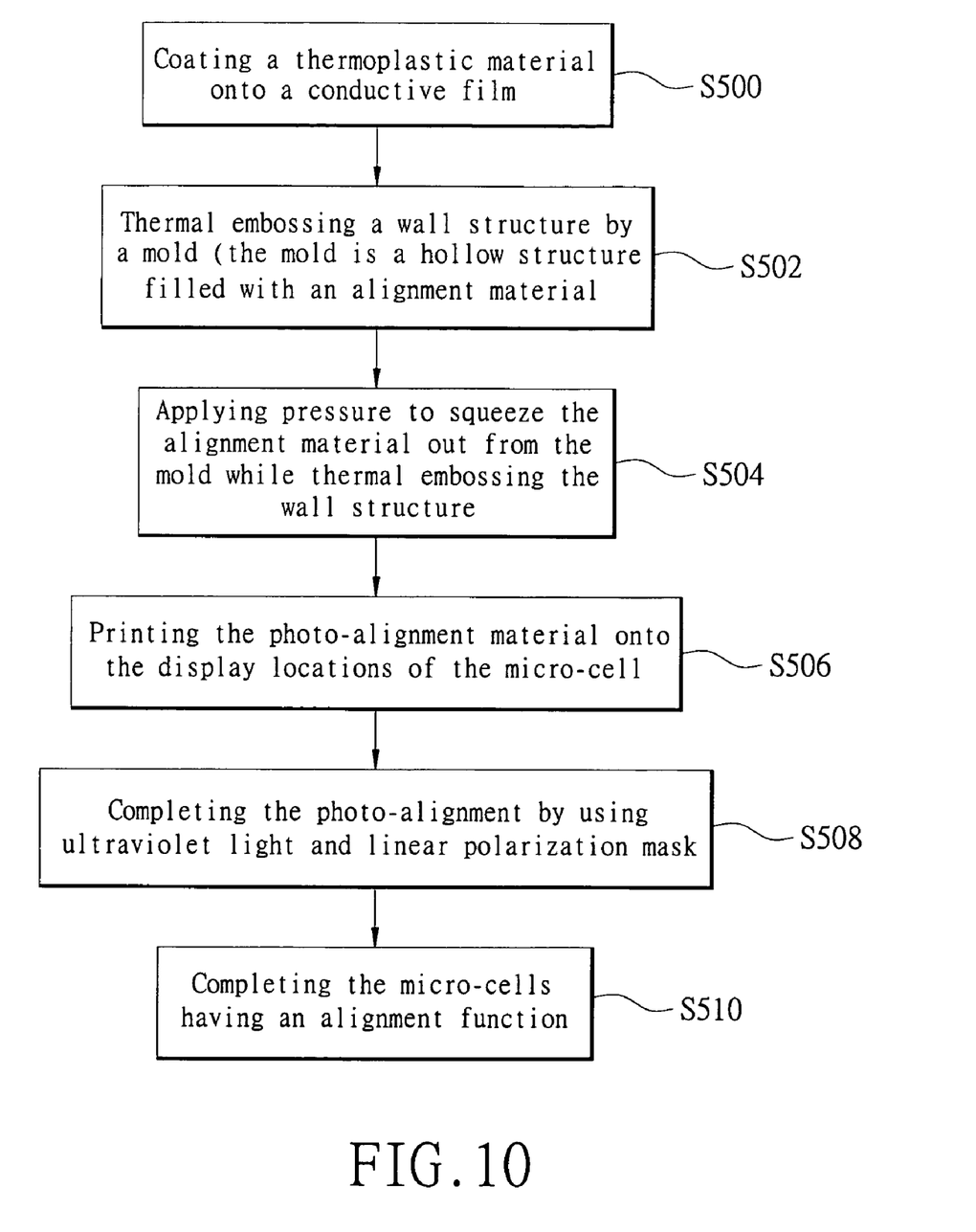
FIG. 10 is a flowchart showing the method of printing photo alignment material and molding wall structures with the roller of the present invention.

FIG. 10 shows a flowchart of a method of alignment when making aligned micro-cell with the rubber roller of the present invention, comprising: coating a thermoplastic material onto a conductive film (S500); thermal embossing a wall structure by a mold (the mold is a hollow structure filled with an alignment material (S502); applying pressure to squeeze the alignment material out from the mold while thermal embossing the wall structure (S504), wherein said photo-alignment solvent is a photo-alignment material, and the surface of the pit of the roller structure includes a porous film; printing the photo-alignment solvent onto the display locations of the micro-grooves (S506); completing the photo-aligning by using ultraviolet light and linear polarization mask. (S508); and completing the micro-cells having an alignment function (S510).

Figure 11:
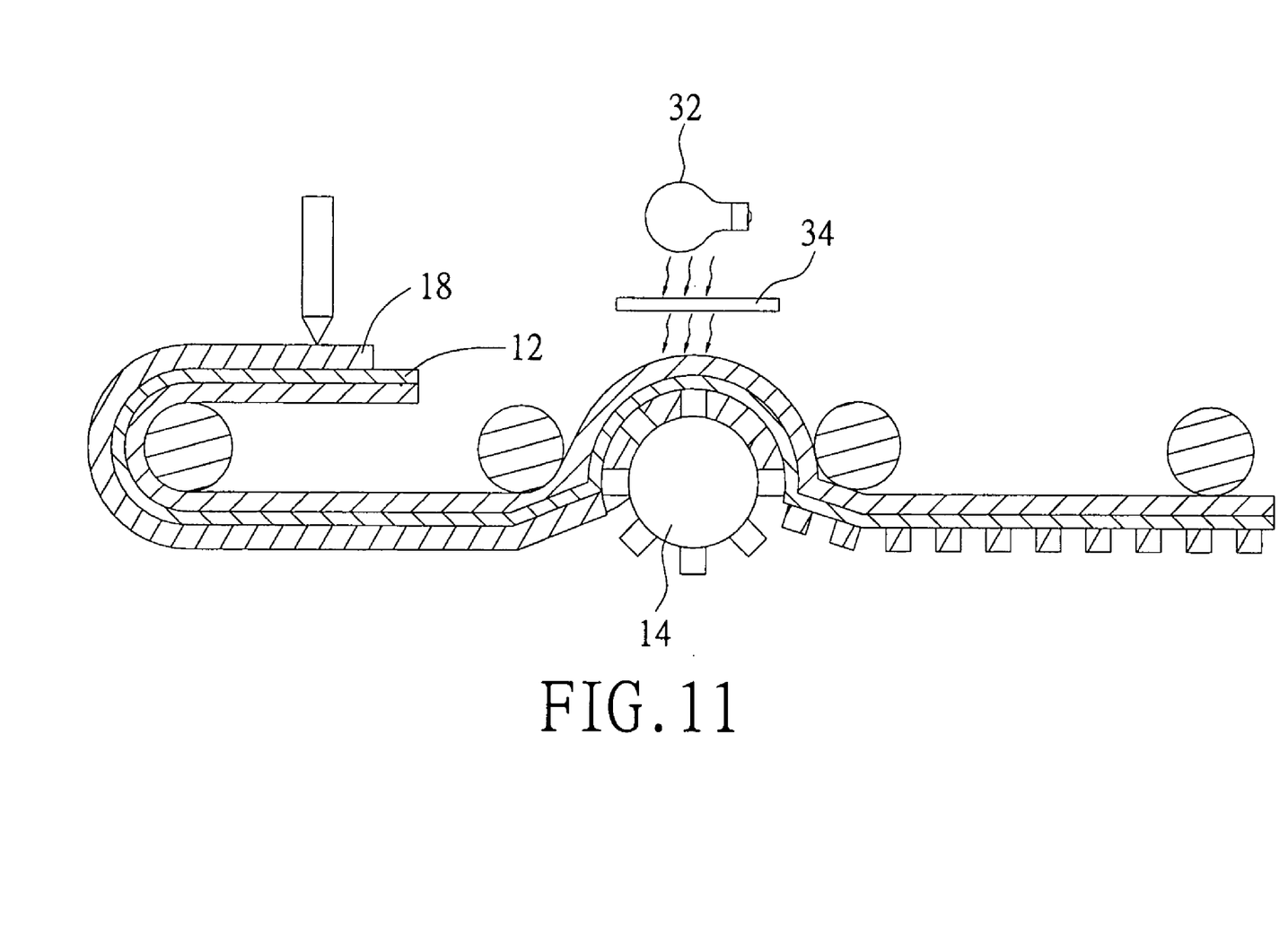
FIG. 11 is a process flow of making aligning micro cell structure with polarized ultraviolet light of the present invention.

FIG. 11 shows a process flow of making aligned micro-cells with polarization ultraviolet light according to the present invention, comprising ultraviolet seal material 18, conductive film 12, a mold 14, polarized ultraviolet light 32 and a polarization mask 34. The photo curable material 18 is embossed by said mold 14. At this stage the surface ultraviolet seal material 18 that is aligned with the polarization ultraviolet light 32 becomes solid. The sections of the photo curable material 18 that were aligned with the polarization ultraviolet light 32, and therefore protected by the polarization mask 34, remain flexible. In this way, a plurality of aligned micro-cell is formed.

Figure 12:
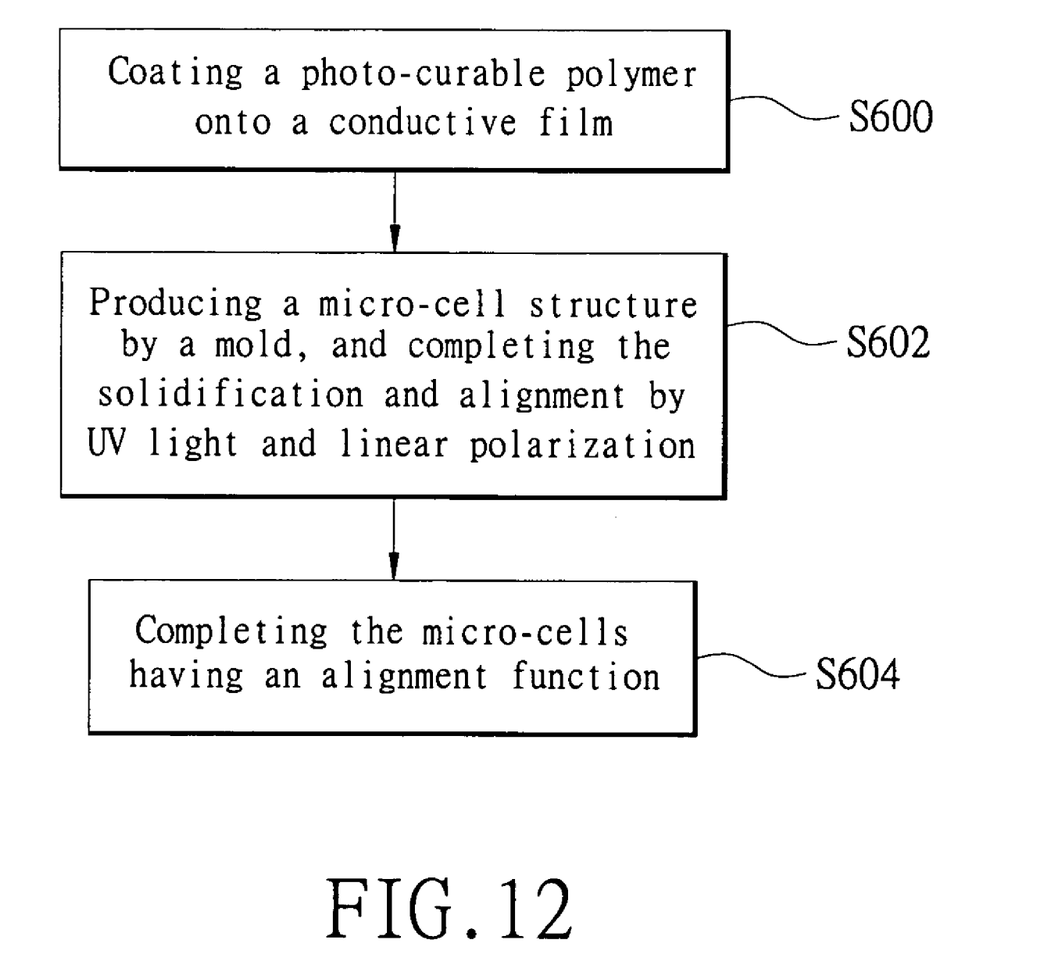
FIG. 12 is a flowchart of making aligning micro cell structure with polarized ultraviolet light of the present invention.

FIG. 12 shows a flowchart of a method of making aligned micro-cell with polarized ultraviolet light according to the present invention, comprising: coating a photo-curable polymer onto a conductive film (S600); producing a micro-cell structure by a mold, and completing the solidification and alignment by UV light and linear polarization mask (S602), wherein the surface of said mold forms said plurality of micro-cells; and Completing the micro-cells having an alignment function. (S604).

To sum up, the alignment technology and micro-cells are integrated into the roll-to-roll process. Thus, a flexible LCD is made for a lower cost and with a better display quality.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of liquid crystal alignment for a flexible LCD with micro-grooves, comprising the steps of:
   coating a thermoplastic material onto a conductive film;
   thermal-embossing a wall structure by a mold, a plurality of micro-grooves being formed on the mold;
   applying pressure to squeeze material of a photo-alignment solvent out from the mold while thermal-embossing the wall structure;
   printing the photo-alignment solvent onto a display location of the micro-grooves; and
   aligning the photo-alignment solvent in the display locations by friction.

2. The method in claim 1, wherein the step of applying pressure includes thermal-embossing the wall structure to form a plurality of micro-cells.

3. The method in claim 2, wherein the photo-alignment solvent forms a plurality of aligned micro-cells.

4. A method of liquid crystal alignment for a flexible LCD with aligned micro-cell, comprising the steps of:
   coating a thermoplastic material onto a conductive film;
   thermal-embossing a wall structure by a mold, a plurality of micro-cells being formed on the mold;
   applying pressure to squeeze material of a photo-alignment solvent out from said mold while thermal-embossing the wall structure;
   printing the photo-alignment solvent onto a display location of the micro-cells;
   aligning the photo-alignment solvent in the display location by an exposure process using UV light and a light polarization mask; and
   completing the micro-cells having an alignment function.

5. The method in claim 4, wherein the photo-alignment solvent is a photo-alignment material.

6. The method in claim 4, wherein the step of applying pressure produces a plurality of micro-cells simultaneously.

7. The method in claim 4, wherein the photo-alignment solvent forms a plurality of aligned micro-cells.

8. A method of liquid crystal alignment for a flexible LCD with micro-grooves, comprising the steps of:
   coating a photo-curable polymer onto a conductive film;
   photo-embossing a wall structure by a mold, a plurality of micro-cells being formed on the mold;
   completing a photo-alignment by using an ultraviolet light and a linear polarization mask; and
   forming the micro-cells having an alignment function.

9. The method in claim 8, wherein the plurality of micro-cells is located inside a plurality of display locations.

* * * * *

UNITED STATES PATENT AND TRADEMARK OFFICE
CERTIFICATE OF CORRECTION

PATENT NO. : 7,641,935 B2
APPLICATION NO. : 11/143487
DATED : January 5, 2010
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1221 days.

Signed and Sealed this

Sixteenth Day of November, 2010

David J. Kappos
*Director of the United States Patent and Trademark Office*